United States Patent Office 2,793,188
Patented May 21, 1957

2,793,188

EXTERNAL OIL PHASE DRILLING FLUID EMULSIONS

Charles B. Swain and Albert G. Schuessler, Oklahoma City, Okla., assignors to Swift & Company, Chicago, Ill., a corporation of Illinois, and Mud Control Laboratories, Inc., Oklahoma City, Okla., a corporation of Delaware, jointly No Drawing. Application October 18, 1954,
Serial No. 463,036

23 Claims. (Cl. 252—8.5)

This invention, in general, relates to water-in-oil emulsions having application in rotary drilling of oil and gas wells. More specifically, the invention relates to a stable emulsion having as the continuous external phase, crude petroleum oil or a refined fraction thereof such as diesel distillate, and an internal dispersed phase consisting of bentonite or clay solids in water or preferably whole mud from conventional drilling operations, to a method of rotary drilling of oil and gas wells using said emulsion, and also to an in situ inversion of an oil-in-water emulsion at the proper stage during the drilling operation.

In usual rotary drilling practice and well completion techniques, an aqueous fluid or an oil-in-water emulsion containing dispersed solids is used to drill oil bearing sands and as the completion fluid. It has frequently been observed that, following usual completion practices with these fluids, the productivity of the well is considerably lower than initially indicated by drill stem tests taken immediately following initial drilling of the pay sand. This failure to attain production levels comparable to that indicated by drill stem tests is authoritatively ascribed to the effects of invasion of the productive zones by filtrate from the drilling fluid. The amount of damage to permeability caused by the mud filtrate invasion appears to vary directly as the time the mud is in contact with the pay zone and inversely as the permeability of the sand.

In productive sands which contain intergranular, "clayey" dirt, of common occurrence in sands of the Pennsylvania series, the generally accepted explanation of this adverse effect is based on the observation that the permeability of cored samples of these sands is adversely affected through swelling of intergranular clays by filtrate from conventional sodium base drilling fluids which generally contain a high concentration of sodium carbonate in the aqueous phase. Sands having permeability of 125 millidarcys or more are damaged to some extent but will usually clear up in a short time. Sands of approximately 60 millidarcys can usually be drilled and a drill stem test taken before much harm is done, but by the time the pipe is set and the well completed, 25–50% of the permeability will have been lost. Sands of 30 millidarcys or less are as a rule blocked off by the time the well is completed and frequently fail to produce commercially even though core analysis has indicated good potential yield. However, a sand may be relatively clean and free of yielding clay inclusions, but if it is of low permeability, it nevertheless may be rendered even less permeable by invasion of water alone since the amount of water that is held by capillary forces will increase as the permeability decreases. Thus, water invasion can magnify many fold the already higher resistance to oil and gas flow of formations of native low permeability. The interaction of carbonate rich filtrates with normal hardness elements present in connate water quite conceivably may contribute also to a reduction in porosity through the precipitation of calcium and magnesium as the carbonates. In any event, damage to pay zones through aqueous fluid invasion from aqueous drilling fluids constitutes a recognized problem, and inasmuch as permeability and water sensitivity of the pay zone may become known only after drilling or coring the formation, the drilling operation should proceed in the presence of a fluid designed to afford maximum protection to the formation.

Thus, as will be apparent from the following description, the emulsions and method of drilling of the present invention are especially adapted for drilling water sensitive pay sands and completion techniques because restoration of original permeability of damaged sands is usually not fully realized by remedial measures presently known.

While external oil phase emulsions have not been generally accepted by the drilling industry for drilling formations other than pay sands, the emulsions of this invention provide advantages which may induce contractors and operators alike to use external oil phase emulsions for drilling formations other than oil-bearing sands. These external oil phase emulsions may be used to drill anhydrite and salt without ill effect to the drilling fluid and have been found to reduce substantially the torque on the drill string, thereby increasing the rate of penetration of the drill bit. The emulsions also exhibit low fluid loss with the result that the formations encountered are not wetted by the drilling fluid. As a result, the bore hole is maintained very close to gauge, and sloughing and heaving of shale formations is materially decreased. The expense of the external oil phase system per well can be materially decreased because the emulsion is stable over long periods of standing and may be utilized in more than one drilling operation.

Therefore, it is an object of this invention to provide a method for preparation of a stable water-in-oil emulsion drilling fluid.

An additional object is to provide a surface active water-in-oil emulsion which will preferentially oil-wet the sand surrounding the bore and leave substantially unaffected the native porosity and permeability of the sand.

An additional object is to provide a water-in-oil emulsion which is basically unaffected by ion contamination originating from drilled up solids.

An additional object is to provide a water-in-oil emulsion which remains stable in field applications.

An additional object is to provide a method of drilling in the pay zone strata using a stable water-in-oil emulsion which affords protection to the native permeability of the pay sands.

Another object is to provide a method of inverting an oil-in-water drilling fluid to a water-in-oil emulsion as the drilling operation progresses.

Other objects will be apparent to one skilled in the art from the following detailed description.

In general, the present invention relates to water-in-oil emulsion drilling and completion fluids, methods for preparing said fluids, and applications of said fluids in rotary well drilling techniques. The drilling fluid is a water-in-oil emulsion, the continuous external oil phase comprising petroleum oil, either crude oil or refined fractions thereof, such as diesel distillate. The system is emulsified by a surface active agent comprising a polyvalent metal salt of sulfated sperm oil. Dispersed in the aqueous phase are fine solids such as bentonite, clays and/or drilled up solids, and weighting materials, if needed.

Sperm oil is obtained from the blubber and head cavity of the sperm whale (Physeteridae) and comprises mainly wax esters of higher fatty acids and fatty alcohols (about 70%) with subordinate amounts of triglycerides (about 30%). The primary surface-active ingredients of sulfated sperm oil salts of this invention are polyvalent metal salts of wax esters of higher monohydric aliphatic alcohols ($C_{14}$–$C_{20}$ in chain length) and long chain aliphatic monocarboxylic acids ($C_{10}$–$C_{20}$ in chain length) which are formed by sulfation at the double bonds of the esters of saturated alcohols and unsaturated acids, unsaturated alcohols and saturated acids, and unsaturated alcohols and unsaturated acids, and combination of the sulfate groups with the polyvalent metal to form the salt.

The external oil phase emulsion is best prepared by vigorous agitation of gas free petroleum oil, an alkali salt of sulfated sperm oil and a defoamer of the types described in a copending application of F. E. Lacey, A. G. Schuessler and C. B. Swain, Serial No. 452,228, filed August 25, 1954, and a polyvalent metal salt capable of base exchange with alkali salts of sulfated sperm oil. Thereafter, a water base mud is added, and agitation is mintained for at least one hour to improve the characteristics of the external oil phase mud, after which a weighting material such as barium sulfate or iron oxide may be added, if desired. About 0.5% of the alkali salt of sulfated sperm oil plus defoamer by volume is sufficient. The upper limit is governed chiefly by economic factors. About 1.5–3 percent of sperm oil plus defoamer is generally employed to emulsify the system.

The base exchange should take place before the aqueous mud phase is added to the system. Base exchange may be accomplished by agitation of the sperm oil and a concentrated aqueous solution of a polyvalent metal salt or water soluble dry solid if there is some moisture in the sperm oil.

Because the external fluid phase of such a system is a surface active oil, there exists little or no resistance to shear, thereby necessitating the addition of a carrying agent, if it is desired to use weighting material. This carrying agent is a compound which does not in any manner minimize the advantages of the over-all system nor will it affect the rheological properties of the total system. It functions only as a carrying agent for the high specific gravity weighting material and is not chemically reactive with either the drilling fluid or the formations of the well bore and, if utilized, may be introduced into the oil phase along with the additive and polyvalent metal salt prior to addition of the mud phase or at any time thereafter. A suspending agent suggested for use in the drilling fluids of this invention is a purified petroleum sulfonate or crude tall oil pitch. In weighted systems, the addition of 2–3 lbs. of sulfonate per barrel of drilling fluid provides the necessary weight suspension properties.

An oil-in-water emulsion or a water base fluid is generally preferred for drilling through various formations to the pay sand. However, it has been found that these fluids, when used to drill into the pay sand, lower the yield of many types of producing sands by migration of the filtrate into the producing formation. While this damage may be mitigated to a large extent by the inhibitive drilling fluid of the aforementioned copending application, we prefer to employ the external oil phase emulsion of this invention to drill into pay formations. One embodiment of our method for drilling involves substitution of an external oil phase emulsion in drilling oil bearing formations and completion thereof. This water-in-oil emulsion may be formulated according to the foregoing procedure in a separate pit or tank and pumped into the bore to displace hole fluid of the former system.

As an alternative, it may be desirable for economic or other reasons to utilize the oil-in-water drilling fluid in compounding the external oil phase emulsion of this invention. The oil-in-water drilling fluid may be a mechanical dispersion of oil-in-water, or the system may be emulsions prepared by the use of the salts of sulfated sperm oil in the aforementioned copending application or other emulsifiers. The effectiveness of the additive of this invention does not appear to be altered by the presence of other emulsifying agents in the system.

The in situ inversion may be achieved by adding thoroughly mixed petroleum oil, polyvalent metal salt, and an alkali salt of sulfated sperm oil plus defoamer to the mud system at the pump suction until the percent of petroleum oil exceeds 50 percent of the total mud volume. Agitation in the pump and circulating system provides the necessary mixing to produce a stable water-in-oil drilling mud. If the oil-in-water drilling fluid used prior to inversion is of the type described in the aforementioned copending application, i. e., an alkali metal or alkaline earth salt of sulfated sperm oil and defoamer, it may be decessary to merely add amounts of sperm oil in sufficient quantity to refortify the mud system.

The in situ inversion technique comprises the addition of petroleum oil, polyvalent metal salt, and alkali salt of sulfated sperm oil to the circulating system, preferably at the pump suction. If, for example, a 60 percent oil phase is desired, the petroleum oil mixture is added at a rate approximating 60 percent petroleum oil and 40 percent fresh water mud drawn from the mud pit. The inverted mud is pumped into the bore and displaces the fluid therein. The displaced fluid discharging to the surface of the bore is channeled partially to the mud pit, and a portion is discarded or run into a reserve pit. In the instant example, 60 percent would be discharged and 40 percent returned to the mud pit to maintain the mud pit level. Since it is undesirable to discharge the water-in-oil emulsion thus formed when the original bore fluid has been completely displaced from the bore, the preferred procedure at this point is to begin return of all of the fluid to the mud pit. In so doing, it is necessary to lower the mud pit level sometime prior to the return of the water-in-oil emulsion fluid to the well surface by decreasing the proportion returning to the mud pit.

Assuming a 1200 barrel system with a 900 barrel hole volume and a 300 barrel pit volume, the inversion would proceed substantially as follows:

If the original mud were a fresh water mud and a 60/40 oil to water ratio is desired, the valves in the system would be adjusted to provide an intake to the pump suction of 60 percent oil containing the aforementioned ingredients and 40 percent of the fresh water mud from the mud pits. As the displaced fresh water mud is discharged to the well surface, 60 percent would be discarded and 40 percent returned to the mud pit to maintain a constant volume in said pit. Sometime prior to complete displacement of the fresh water mud in the hole, the mud pit level should be lowered by 60 percent of its volume or 180 barrels by discharging added amounts of fresh water mud instead of returning said mud to the mud pit. When the discharge shows that the water-in-oil emulsion has returned to the well surface, the discharge valves are closed and all of the displaced fluid is returned to the mud pit. Continued circulation will withdraw the remainder of the fresh water mud from the mud pit, and the addition of oil to the system will be completed when the fresh water mud is exhausted from the mud pit.

If the fresh water mud in the above procedure were a 10 percent oil-in-water emulsion, the petroleum oil mixture would be added at a ratio of 55.5 volumes of oil to 44.5 volumes of the oil-in-water emulsion. The rates of discharge and return to the mud pit would be adjusted accordingly.

More specifically, the water-in-oil emulsions for general applications comprise:

40–80% crude oil by volume containing 1.5–10% sperm oil addition (based by weight on final emulsions)
60–20% water base mud by volume
1–5 lbs. polyvalent metal salt per 40 gallons of oil In the above formulation, it is preferred to keep the oil volume within the limits of 50–70 percent to provide the best rheological properties to the drilling fluid. The viscosity of the fluid is important in its effect upon fluid loss. The optimum oil water ratio and consequently the viscosity is dependent upon the solids carried by the oil phase and hence cannot be predicted with certainty. For this reason, it is the best practice to run a pilot scale test with a sample of the fresh water mud to be used in compounding the final external oil phase drilling fluid.

The amounts of each salt added are subject to variation depending upon the conditions encountered and the particular salt used as a replacement. The salt concentration in the aqueous phase should be at least sufficient to assure base exchange with the sulfated emulsifiers. However, high concentrations in the order of 12,000 to 15,000 parts per million are desirable to further assure base exchange and for the beneficial effects of these salts on oil bearing formations. A conventional fresh water mud which is either lightly or heavily treated with conventional chemicals and of good particle size distribution is desirable as the mud phase.

Preferred polyvalent metal ions for preparation of the external oil phase emulsions of the present invention are in order of effectiveness—$Al^{+++}$, $Zn^{++}$, $Pb^{++}$, and $Ca^{++}$.

The inversion properties of these ions were tested by formulating a 500 ml. external oil phase system comprising the following constituents:

290 ml. crude oil
10 ml. (2 volume percent) sodium salt of sulfated sperm oil
3#/bbl. polyvalent metal salt
197 ml. field mud.

Fluid properties of the external oil phase systems were:

Wt., lbs./gal____ 8.0.
Viscosity, cpe____ 60–80.
Initial gels–10'____ 0–0.
Fluid loss 30'____ 0.0–1.0 ml.
Surface tension____ approximately 4 dynes less than crude oil.

In determining the volume ratio of water base mud to oil the desired centipoise viscosity requirements are estimated in advance. If the mud is to be weighted with clay solids or other weighting agents, a minimum viscosity of 80 centipoise after weighting is preferred. The final viscosity depends upon the specific gravity of the oil, the viscosity of the water base or oil-in-water mud, and non-linear viscosity increase as the percent water base mud is increased. It is generally preferred to prepare a sample mixture before formulating a complete system.

The apparent function of the inorganic salt is the conversion of the sulfated esters to the appropriate salt. This conversion changes the emulsifier and effects the formation of an external oil phase emulsion. The conversion of this external water phase system to an external oil phase system appears to involve the conversion of the sulfated sperm oil alkali metal salt to a polyvalent metal salt of sulfated sperm oil by the reaction involving the electromotive force differential between the alkali and polyvalent metal salts. This same reaction will simul-

|  | $CaCl_2$ | $Ca(OH)_2$ | $Ca(OH)_2+CaCl_2$ | $ZnSO_4$ | $Pb(NO_3)$ | $AlCl_3$ | $AlCl_3+Ca(OH)_2$ | $PbCl_2$ | $PbCl_2+Ca(OH)_2$ |
|---|---|---|---|---|---|---|---|---|---|
| Visc., Cpe | 66.0 | 32.0 | 77.0 | 45.0 | 58.0 | 74.0 | 53.0 | 32.0 | 38.5 |
| Gels | 0–1 | 0–0 | 1–1 | 0–0 | 0–0 | 0–1 | 0–0 | 0–0 | 0–0 |
| Fluid Loss 7½', ml | 0.6 | 1.1 | 0.2 | 1 drop | 0.2 | 0.0 | 0.0 | 1.0 | 1.8 |
| Fluid Loss 30', ml | 3.1 | 3.8 | 2.4 | 1.8 | 2.2 | 0.1 | ¹ 0–0 | 5.0 | 44.9— |
| Water Portion, ml | 1.0 | None | 0.8 | 0.8 | 0.6 | None | None | None | None |
| Cake | —¹⁄₆₄" | ¹⁄₆₄" | ¹⁄₆₄" | ¹⁄₆₄" | ¹⁄₆₄" | —¹⁄₆₄" | —¹⁄₆₄" | ³⁄₆₄" | ³⁄₃₂" |

¹ No fluid loss in 30'. First drop in 80 minutes.

In making the above systems, the sulfated sperm oil phase is added to the oil phase under agitation. The polyvalent metal ion is then added to the oil phase. After 4 to 5 minutes of stirring to allow for reaction of the added ion with the alkali metal salt of sulfated sperm oil, the mud phase is added.

Calcium hydroxide is preferably included in any of the systems to maintain an excess of calcium ions for purposes described herein and to control acidity in the drilling fluid. Acidity control is particularly important in the case of aluminum chloride which can be corrosive at higher temperatures due to hydrolysis of the aluminum chloride. Calcium as the hydroxide will produce an inverted system, but the fluid loss filtrate is an emulsion of the water-in-oil type rather than the preferred all oil loss produced by other embodiments.

In fluids having an oil phase volume in the order of 60 to 70 percent or higher, a mud phase which is high in solids and highly dispersed by means of thinning agents such as caustic and quebracho is desirable for attaining a fluid of acceptable characteristics. The quality, quantity, dispersion and dispersibility of the solids affect the quality of the inverted system. The mud in a 60 percent external oil phase fluid having optimum rheological characteristics should have a high solids content, e. g., 20–30 percent, good particle size distribution, and amenability to infinite particle dispersion following inversion. The same considerations apply to salt saturated muds which may also be inverted by the procedures described herein.

Using a fresh water mud system with average properties and a crude oil, preferably non-paraffinic, in a ratio of 60 percent by volume of oil to 40 percent by volume of mud, the following average properties may be expected:

taneously reduce the magnitude of the hydrated clay to a workable range and provide a less negatively charged dispersed bentonitic solids.

The polyvalent metal salt of sulfated sperm oil may be compounded by the manufacturer instead of the conversion thereto by base exchange with an alkali salt of sulfated sperm oil at the well site. In such an instance, addition of the salts, particularly calcium, is still desirable to flocculate the mud phase solids.

The inverted emulsions are unusually stable to ion contamination normally encountered in drilling oil wells. They are insensitive to further addition of calcium or magnesium ions and will tolerate saturation in the aqueous phase by evaporites such as gypsum, anhydrites, and halite without deleterious effect on the emulsions. Unlike many external oil phase drilling fluids, they are capable of dispersing and holding sizeable quantities of solids and may be weighted sufficiently to control high formation pressures.

The presence of calcium ion or other polyvalent metal ions in the inverted emulsion gives a drilling composition which combines the properties of oil base and salt saturated muds. The fluid loss is oil containing microscopic or submicroscopic particles of water containing polyvalent metal ions. These particles of water containing said ions, particularly calcium ions, inhibit the swelling of intergranular clays in the pay zone by providing the cation-rich environment which is chemically similar to the environment provided by connate water in the pay zone. Moreover, since the invading fluid is substantially surface active oil, it assists in causing the sand to become preferentially oil wet and therefore increases the permeability of the sand in favor of increased production. These benefits are believed to be traceable to the presence of sufficient surface active materials to reduce interfacial forces to such an extent as to assist in the removal of interstitial water including filtrate and invading mud particles.

The emulsified system of this invention may be employed with success in dual completions. Where two or more separate producing sands are to be drilled, the operation through the upper producing sand is the same as that previously described. After the inverted system has been used to drill through the upper producing sand, drilling is continued with the water-in-oil emulsion to provide protection to the upper sand.

on these characteristics was determined in various oil to mud ratios. The systems were formulated by suspension in the oil phase of 4 lbs. of calcium chloride per barrel of oil and addition to the oil phase of 2 percent by volume of the sodium salt of sulfated sperm oil plus a mixture of complex compounds obtained as the residue from the propane decolorization of fatty materials as a defoamer. After thorough agitation of the oil-calcium chloride-surfactant mixture, the desired mud phase material was then added to the prepared oil phase. The aqueous phase was thoroughly dispersed in the oil phase by vigorous agitation.

The following data was obtained:

|  | Field Mud | External Oil Phase Emulsions | | | | | | | | |
|---|---|---|---|---|---|---|---|---|---|---|
| Oil Phase |  | 70.0 | 70.0 | 70.0 | 60.0 | 60.0 | 60.0 | 50.0 | 50.0 | 50.0 |
| Mud Phase |  | 30.0 | 30.0 | 30.0 | 40.0 | 40.0 | 40.0 | 50.0 | 50.0 | 50.0 |
| Weighted |  | No | Yes | Yes | No | Yes | Yes | No | Yes | Yes |
| Lbs./gal | 10.2 | 7.8 | 12.0 | 15.0 | 8.2 | 12.0 | 15.0 | 8.8 | 12.0 | 15.0 |
| Vis., Cpe | 45.0 | 38.0 | 74.0 | 99.0 | 62.0 | 111.0 | 160.0 | 75.0 | 153.0 | 160 |
| Init. Gel | 0 | 0 | 0 | 0 | 0 | 0 | 0 | 10 | 20 | 20 |
| 10' Gel | 30 | 0 | 0 | 0 | 0 | 0 | 0 | 10 | 20 | 20 |
| Fluid Loss 30' | 6.0 | 3.0 | 1.4 | 1.4 | 2.2 | 1.7 | 0.1 | 0.9 | 0.5 | 0.2 |
| Cake 32/" | 3 | 1½ | 1 | 1 | 2 | 1½ | 1 | 1 | 2 | 3 |

The external oil phase emulsions of this invention have utility as a completion fluid after the pay sand has been drilled. The surface activity of the additive of this invention enhances preferential oil wetting of the pay sand which in turn contributes to improve permeability of the sands to oil. In addition the presence of polyvalent metal ions, particularly calcium, produces a shrinking effect on intergranular clays which have been hydrated at some time prior to the completion period.

The water-in-oil emulsions of this invention may also be used to advantage as "killing" fluid in stopping a producing well for a period of time. The fluid will not endanger the productivity of the well by water wetting the productive section.

The active ingredients of the sperm oil additives of this invention are polyvalent metal salts of sulfated esters of fatty alchols and fatty acids. Sulfation is accomplished by reaction of unsaturated esters with concentrated sulphuric acid. The method of preparation is more particularly described in the aforementioned copending application. In preparing a commercial polyvalent metal salt of sulfated sperm oil, the excess acid is removed by washing with an aqueous solution of a water soluble salt of the particular polyvalent metal desired in the final end product. Neutralization of the sulfated oil may be accomplished in one of two manners to form the polyvalent metal salt thereof. The sulfated oil may be reacted directly with a basic salt or the hydroxide of the desired polyvalent metal. The other procedure is the formation of an alkali metal salt of sulfated sperm oil followed by base exchange with an inorganic salt of the polyvalent metal desired as more particularly described in the aforementioned copending application.

The additive also contains a defoamer. A mixture of complex compounds obtained as the residue from propane decolorization of fatty materials is the preferred defoamer because the mixture is surface active and contributes additional surface activity to the fluid. This composition is more fully described in United States Patent No. 2,668,138, issued to John J. Walker and John E. Farbak on February 2, 1954. Other defoamers such as pine oil, castor oil, linseed oil, sugar cane oil obtained from dewaxing of sugar cane and diesel distillate may be used as the defoamer, if desired.

*Example I*

External oil phase emulsions were prepared in which the ratio of oil to mud phase was varied to bring about changes in viscosity, gels and fluid loss in unweighted systems. Also, weightability and the effect of weighting

*Example II*

An external oil phase emulsion drilling fluid of the type herein disclosed was used as a work-over fluid for a well in the Eunice area, Lea County, New Mexico. Before addition of weighting material, the fluid had the following characteristics:

Weight #/gal _____ 8.4.
Funnel viscosity _____ 67.
Stormer viscosity _____ 37.
Initial gel _____ 0.
10' gel _____ 0.
Cake _____ 1/64.
Fluid loss _____ 3.4 based on 7.5 mins.
Oil phase _____ 70.7% by volume.

A suspending agent was added to the fluid which was circulated for about 30 minutes; then weighing agent was added slowly until the weight reached 9.5 per gallon. Some difficulty was encountered in holding the weighting agent in suspension when the system was not in circulation. After increasing the Stormer viscosity to 55 centipoise by the addition of lime, no reduction in weight was observed in the pits or in the sample cut after a period of 2 hours without agitation. The fluid was then pumped into the hole and remained there without agitation or circulation for approximately 10 hours during perforation and other operations. The weight of the fluid dropped only 0.2# per gallon during this period. The inorganic salt used as the inverting agent was in this instance calcium chloride.

The characteristics of the final system were:

Weight, #/gal _____ 10.0.
Viscosity, funnel sec./qt _____ 75.
Viscosity, cpe _____ 55.
Gels _____ 0.0.
Fluid loss, 30' _____ 1.0 ml., all oil.
Cake thickness _____ 1/64" (very tough).

The upper Blinberry formation after work-over was perforated. It kicked off and flowed 2,400,000 cu. ft. of gas per day at 800 lbs. presssure through a ¼ inch choke. This sand also yielded 1.25 barrels of distillate per hour.

The lower Tubbs formation after a 3,000 gallon acid treatment flowed 4,670,000 cu. ft. of gas per day at a flowing pressure of 1790 lbs. The formation also produced 3.5 barrels of distillate per hour.

Another suggested method for increasing viscosity of the drilling fluids is the inclusion of aluminum chloride in the inverting agent mixture. A suggested mixture of inorganic salts for this purpose is: 1½ lbs. $CaCl_2$, 1½ lbs. $ZnSO_4$, and 1 lb. $AlCl_3$ per barrel in a 60/40 external oil phase fluid. A system prepared with this mixture of inorganic salts had the following characteristics:

|  | Original | 300° F. after 16 hrs. | Restored |
|---|---|---|---|
| Wgt., #/gal | 8.42 |  | 96.0 |
| Visc., cpe | 79.0 | 96.0 | 96.0 |
| Gels | 0–0 | 0–0 | 0–0 |
| 30' F. L | 0.5 | 1.9 | 0.0. |
| Cake | 1/64" Soft | 1/64" Soft | 1/64". |
| H₂O in fluid | None | Trace | None. |

The data is reported for the original fluid, the emulsion after bombing at 300° F. for 16 hours and the restored emulsion after bombing with a 1% emulsifier supplement.

*Example III*

A drilling fluid of this invention was used as a workover fluid on another well in Lea County, New Mexico. The well had dual pay zones, a lower Queens formation and an upper Yates formation. The procedure in the work-over of this well involved killing the upper zone with the external oil phase emulsion. Then the mud was circulated to clean out the lower zone. The fluid was then circulated against the upper Yates sand which had bentonite inclusion. The total completion rig time for both zones was eight days.

Production of the Queen sand before work-over was 2–3 barrels per day. After work-over and fracture, the average production was 14 barrels per day. The upper Yates sand had not previously produced. This sand, when perforated in the presence of the external oil phase emulsion of this invention, kicked off and flowed without further treatment at a rate of 1,800,000 cu. ft. of gas per day, the allowable being 1,000,000 cu. ft. per day. The top hole pressure was 650 lbs.

Obviously, many modifications and variations of the invention as hereinbefore set forth may be made without departing from the spirit and scope thereof, and therefore only such limitations should be imposed as are indicated in the appended claims.

We claim:

1. A fluid having application as a well drilling and completion fluid comprising a water-in-petroleum oil emulsion, solid particles dispersed in said fluid, and an emulsifying agent comprising a polyvalent metal salt of sulfated sperm oil.

2. A fluid having application as a well drilling and completion fluid comprising a water-in-petroleum oil emulsion, solid particles dispersed in said fluid, said water and oil emulsified by a surface active agent containing as an active essential ingredient thereof a polyvalent metal salt of sulfated wax esters of aliphatic monohydric alcohols having between 14 and 20 carbons and aliphatic monocarboxylic acids having between 10 and 20 carbons.

3. A fluid of claim 1 wherein the surface activity of said sulfated sperm oil salt is supplemented by a lesser amount of a mixture of complex materials obtained as the residue of propane decolorization of the fatty materials.

4. A fluid having application as a well drilling and completion fluid comprising a water-in-petroleum oil emulsion, solid particles dispersed in said fluid, and an emulsifying agent comprising a polyvalent metal salt of sulfated sperm oil from the group consisting of aluminum, zinc, lead, and calcium.

5. A fluid having application as a well drilling and completion fluid comprising a water-in-oil emulsion containing at least 40% oil, bentonitic particles dispersed in said fluid, said emulsion containing an emulsifying agent comprising a polyvalent metal salt of sulfated sperm oil from the group consisting of aluminum, zinc, lead, and calcium salts, and, as a supplement to said sperm oil salt, a mixture of complex compounds obtained as the residue in propane decolorization of fatty materials.

6. A fluid having application as a well drilling and completion fluid comprising a water-in-oil emulsion containing at least 40% oil, solid particles dispersed in said fluid, said emulsion containing an emulsifying agent comprising a polyvalent metal salt of sulfated sperm oil, and a calcium electrolyte in the aqueous phase for minimizing hydration of hydratable intergranular clays in oil bearing sands.

7. A fluid having application as a well drilling and completion fluid comprising a water-in-petroleum oil emulsion, solid particles dispersed in said fluid, said water and oil emulsified by a surface active agent containing as an active essential ingredient thereof a polyvalent metal salt of a sulfated mixture comprising approximately 70% of wax esters of aliphatic monohydric alcohols having between 14 and 20 carbons and aliphatic monocarboxylic acids having between 10 and 20 carbons and approximately 30% triglycerides.

8. A fluid having application as a well drilling and completion fluid comprising a water-in-petroleum oil emulsion, the oil phase comprising 40–80% of the fluid by volume, solid particles dispersed in said fluid, said water and oil emulsified by a surface active agent containing as an active essential ingredient thereof a polyvalent metal salt of sulfated wax esters of aliphatic monohydric alcohols having between 14 and 20 carbons and aliphatic monocarboxylic acids having between 10 and 20 carbons, said polyvalent metal from the group consisting of aluminum, zinc, lead, and calcium.

9. A method of drilling oil producing formations with a rotary bit comprising circulation of a drilling fluid to said bit and then to the well surface, said drilling fluid comprising a water-in-oil emulsion with finely divided solids suspended therein and an emulsifier comprising a sulfated sperm oil salt of a bivalent metal.

10. A method of drilling oil producing formations with a rotary bit comprising circulation of a drilling fluid to said bit and then to the well surface, said drilling fluid comprising a water-in-oil emulsion with finely divided solids suspended therein and an emulsifier comprising a polyvalent metal salt of sulfated sperm oil, said polyvalent metal from the group consisting of aluminum, zinc, lead, and calcium, and, as a supplement to said sperm oil salt, a mixture of complex compounds obtained as the residue in propane decolorization of fatty materials.

11. A method of drilling oil producing formations with a rotary bit comprising circulation of a drilling fluid to said bit and then to the well surface, said drilling fluid comprising a water-in-oil emulsion with finely divided solids suspended therein and an emulsifier comprising the calcium salt of sulfated sperm oil.

12. A method of drilling wells with an aqueous base drilling fluid having solid particles dispersed therein and converting said fluid to a water-in-oil emulsion prior to reaching oil producing sand which comprises addition of petroleum oil to said fluid until the oil phase exceeds at least approximately 50% of the total fluid volume, said petroleum oil containing a polyvalent metal salt of sulfated sperm oil as an emulsifier.

13. A method of drilling wells with an oil-in-water emulsion containing as an anionic emulsifier an alkali metal salt of sulfated sperm oil, solid particles dispersed in said emulsion, and inverting said oil-in-water emulsion prior to reaching oil bearing sand which comprises addition of petroleum oil to said emulsion until the oil in said emulsion at least exceeds approximately 50% of the total fluid volume, said oil containing an inorganic polyvalent metal salt and vigorously agitating the mixture to obtain a water-in-oil emulsion.

14. A method of drilling wells with an oil-in-water emulsion containing as an anionic emulsifier an alkali metal salt of sulfated sperm oil and, as a supplement to said sperm oil salt, a mixture of complex compounds obtained as the residue in propane decolorization of fatty materials, bentonitic particles dispersed in said fluid, and inverting said oil-in-water emulsion prior to reaching oil bearing sand which comprises addition of petroleum oil to said emulsion until said petroleum oil in said emulsion at least exceeds approximately 50% of the total fluid volume, said petroleum oil containing an inorganic polyvalent metal salt of a metal from the group consisting of aluminum, zinc, lead and calcium and vigorously agitating the mixture to obtain a water-in-oil emulsion.

15. A fluid having application as a well drilling and completion fluid comprising a water-in-petroleum oil emulsion, the oil phase comprising 40–80% of the fluid by volume, solid particles dispersed in said fluid, said water and oil emulsified by a surface active agent containing as active essential ingredients thereof a polyvalent metal salt of sulfated wax esters of aliphatic monohydric alcohols having between 14 and 20 carbons and aliphatic monocarboxylic acids having between 10 and 20 carbons, and, as a supplement to said polyvalent metal salt, a mixture of complex compounds obtained as the residue in the propane decolorization of fatty materials.

16. A fluid having application as a well drilling and completion fluid comprising a water-in-petroleum oil emulsion, the oil phase comprising 40–80% of the fluid by volume, solid particles dispersed in said fluid, said water and oil emulsified by a surface active agent containing as active essential ingredients thereof the calcium salt of sulfated wax esters of aliphatic monohydric alcohols having betwene 14 and 20 carbons and aliphatic monocarboxylic acids having between 10 and 20 carbons, and, as a supplement to said calcium salt, a mixture of complex compounds obtained as the residue in propane decolorization of fatty materials.

17. A fluid having application as a well drilling and completion fluid comprising a water-in-petroleum oil emulsion, the oil phase comprising 40–80% of the fluid by volume, solid particles dispersed in said fluid, said water and oil emulsified by a surface active agent containing as active essential ingredients thereof a polyvalent metal salt of sulfated wax esters of aliphatic monohydric alcohols having between 14 and 20 carbons and aliphatic monocarboxylic acids having between 10 and 20 carbons, said polyvalent metal from the group consisting of aluminum, zinc, lead, and calcium, and, as a supplement to said polyvalent metal salt, a mixture of complex compounds obtained as the residue in propane decolorization of fatty materials.

18. A fluid having application as a well drilling and completion fluid comprising a water-in-petroleum oil emulsion, the oil phase comprising 40–80% of the fluid by volume, solid particles dispersed in said fluid, said water and oil emulsified by a surface active agent containing as active essential ingredients thereof a polyvalent metal salt of a sulfated mixture comprising approximately 70% of wax esters of aliphatic monohydric alcohols having between 14 and 20 carbons and aliphatic monocarboxylic acids having between 10 and 20 carbons and approximately 30% triglycerides, said polyvalent metal from the group consisting of aluminum, zinc, lead, and calcium, and, as a supplement to said polyvalent metal salt, a mixture of complex compounds obtained as the residue in propane decolorization of fatty materials.

19. A fluid having application as a well drilling and completion fluid comprising a water-in-petroleum oil emulsion, the oil phase comprising 40–80% of the fluid by volume, solid particles dispersed in said fluid, said water and oil emulsified by a surface active agent containing as an active essential ingredient thereof the calcium salt of a sulfated mixture comprising approximately 70% of wax esters of aliphatic monohydric alcohols having between 14 and 20 carbons and aliphatic monocarboxylic acids having between 10 and 20 carbons and approximately 30% triglycerides.

20. A fluid having application as a well drilling and completion fluid comprising a water-in-petroleum oil emulsion, solid particles dispersed in said fluid, said water and oil emulsified by a surface active agent containing as an active essential ingredient thereof a polyvalent metal salt of a sulfated mixture comprising approximately 70% of wax esters of aliphatic monohydric alcohols having between 14 and 20 carbons and aliphatic monocarboxylic acids having between 10 and 20 carbons and approximately 30% triglycerides, said polyvalent metal from the group consisting of aluminum, zinc, lead, and calcium.

21. A fluid having application as a well drilling and completion fluid comprising a water-in-petroleum oil emulsion, the oil phase comprising 40–80% of the fluid; bentonitic particles dispersed in said fluid; said water and oil emulsified by a surface active agent containing as active essential ingredients thereof a polyvalent metal salt of a sulfated mixture comprising approximately 70% of wax esters of aliphatic monohydric alcohols having between 14 and 20 carbons and aliphatic monocarboxylic acids having between 10 and 20 carbons and approximately 30% triglycerides, said polyvalent metal from the group consisting of aluminum, zinc, lead and calcium, and, as a supplement to said polyvalent metal salt, a mixture of complex compounds obtained as the residue in propane decolorization of fatty materials; and a bivalent metal electrolyte dissolved in the aqueous phase of said emulsion to inhibit swelling of the hydratable formation solids.

22. A fluid having application as a well drilling and completion fluid comprising a water-in-petroleum oil emulsion, the oil phase comprising 40–80% of the fluid by volume; solid particles dispersed in said fluid; said water and oil emulsified by a surface active agent containing as active essential ingredients thereof a polyvalent metal salt of a sulfated mixture comprising approximately 70% of wax esters of aliphatic monohydric alcohols having between 14 and 20 carbons and aliphatic monocarboxylic acids having between 10 and 20 carbons and approximately 30% triglycerides, and, as a supplement to said polyvalent metal salt, a mixture of complex compounds obtained as the residue in propane decolorization of fatty materials.

23. In a method of rotary drilling of water-wet subterranean oil bearing formations the steps which comprise: rotary drilling said formation with a rotary drilling bit while circulating a fluid down the well bore to the drill bit and thence back to the well surface, said fluid comprising an emulsion with oil as the external continuous phase and water as the internal dispersed phase said fluid having dissolved therein a polyvalent metal salt of a sulfated sperm oil, said fluid enhancing the preferential oil wetting of the said formation.

References Cited in the file of this patent

UNITED STATES PATENTS 2,497,398   Dawson  ---------------- Feb. 14, 1950

OTHER REFERENCES

Berkman and Egloff: Emulsions and Foams, pub. 1941 by Reinhold Pub. Corp. of New York, pages 60 to 71.

Emulsion Technology, second ed. pub. 1946 by Chemical Pub. Co., Inc. of Brooklyn, New York, pages 15 and 16.

Schwartz-Perry: Surface Active Agents, pub. 1949 by Inter-Science Publishers, Inc., of New York, pages 9 and 10.

Notice of Adverse Decision in Interference

In Interference No. 90,431 involving Patent No. 2,793,188, C. B. Swain and A. G. Schuessler, External oil phase drilling fluid emulsions, final judgment adverse to the patentees was rendered Aug. 27, 1962, as to claims 1, 6, 9, 11, 12 and 13.
[*Official Gazette October 27, 1964.*]